Sept. 12, 1967    J. T. ELLIS, JR    3,340,965
ADJUSTABLE SHOCK ABSORBER
Filed Sept. 13, 1965
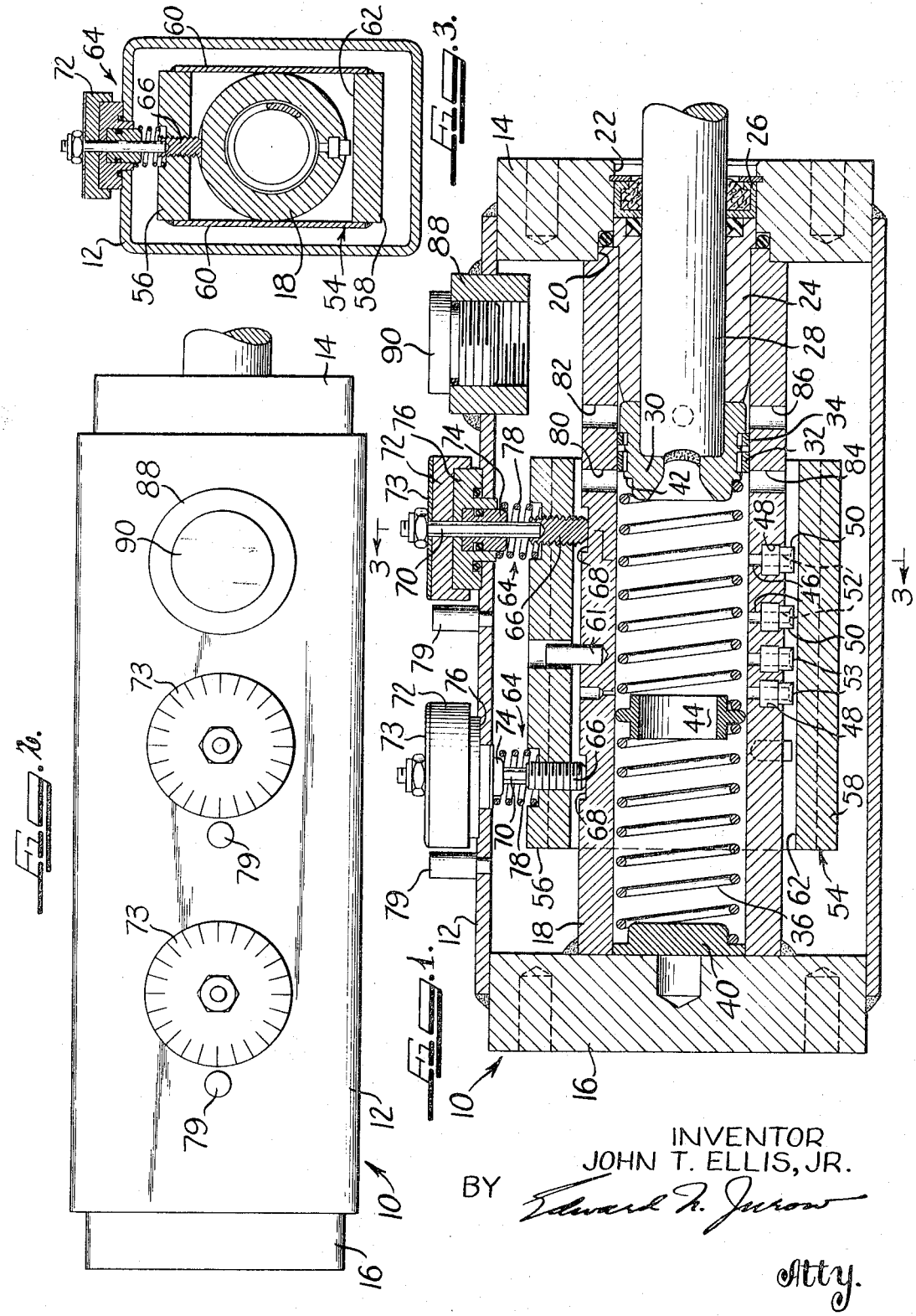
INVENTOR
JOHN T. ELLIS, JR.
BY
Atty.

3,340,965
ADJUSTABLE SHOCK ABSORBER
John T. Ellis, Jr., Chicago, Ill., assignor to Ellis Fluid Dynamics Corporation, Chicago, Ill., a corporation of Illinois
Filed Sept. 13, 1965, Ser. No. 486,971
4 Claims. (Cl. 188—97)

ABSTRACT OF THE DISCLOSURE

An adjustable hydraulic shock absorber having a pressure cylinder with a series of axially spaced ports all of which are controlled by the radial movement of an exteral planar flow control member toward and away therefrom with each end of the flow control member being movable by one of a pair of independent means accessible from outside the shock absorber.

My present invention relates generally to an adjustable shock absorber for use, for example, in aircraft, automotive, machine and railroad applications, and more particularly to a hydraulic shock absorber including adjustable metering orifices.

A hydraulic shock absorber, of the type to which my present invention pertains, comprises a pressure tube having slidably mounted therein a piston which is connected to a piston rod adapted to receive impact forces. The pressure tube is provided with bores in the wall thereof, each with an exterior seat thereabout, through which hydraulic fluid is adapted to be metered during actuation of the shock absorber. The bores may be of uniform diameter spaced apart exponentially so that as the bores are successively closed off by the piston during its inward stroke the total effective fluid metering area decreases exponentially with the stroke of the piston. By reason of this arrangement, the shock absorber in normal operation provides a uniform stopping force as well as a uniform rate of deceleration throughout the stroke. Alternatively, the same operating characteristics may be obtained by providing uniformly spaced bores of exponentially varying diameter.

It is an object of my present invention to provide a hydraulic shock absorber of the type described which is capable of being adjusted to accommodate deceleration of loads of differing kinetic energy quantities. In this connection, I arrange a flow control member adjacent the seat of the bores whereby a plurality of annular orifices are defined therebetween. To permit the peripheral areas of the imaginary cylinders between the seats and the flow control member, which constitute the annular orifices, to be regulated whereby to accommodate loads or impact forces of different kinetic energy, I provide means for moving the flow control member relative to the seats.

It is another object of my present invention to provide a hydraulic shock absorber, as described, wherein the flow control member is in the form of a cage or saddle assembly surrounding the pressure tube and mounted for radial movement relative to the pressure tube.

It is a further object of my present invention to provide a hydraulic shock absorber, as described, wherein means are provided for independently moving the opposite ends of the saddle assembly radially of the pressure tube for regulating the size of the orifices, whereby regular, or modified, exponential damping may be attained. With this arrangement, the size of the orifices may be increased or decreased, either uniformly by equally adjusting the radial position of the ends of the saddle assembly, or non-uniformly by unequally adjusting the radial position of the ends thereof.

Now in order to acquaint those skilled in the art with the manner of construction and using hydraulic shock absorbers in accordance with the principles of my present invention, I shall described in connection with the accompanying drawing a preferred embodiment of my invention.

In the drawing:

FIGURE 1 is a longitudinal median sectional view of a shock absorber incorporating the principles of my present invention;

FIGURE 2 is a plan view of the shock absorber of FIGURE 1; and

FIGURE 3 is a transverse sectional view of the shock absorber of FIGURE 1, taken substantially along the line 3—3 in FIGURE 1, looking in the direction indicated by the arrows.

Referring now to the drawing, there is indicated generally by the reference numeral 10 a hydraulic shock absorber incorporating the principles of my present invention. The shock absorber 10 includes an outer housing comprised of a tube 12, which may be rectangular in cross section, a front end plate or head 14, and a rear end plate or head 16, all suitably welded in position in a conventional manner. Arranged within the outer housing is a cylindrical pressure tube 18 which, at its forward end, is received in an annular recess 20 formed in the inner face of the front end plate 14 and, at its rearward end, is suitably welded to the inner face of the rear end plate 16.

Mounted within a central axial opening 22 formed in the front end plate 14 are a rearwardly extending piston rod bearing 24, and wiper and seal assembly means 26. Slidably mounted within the piston rod bearing 24 is a piston rod 28 that projects outwardly of the pressure tube 18 and the shock absorber housing. The wiper and seal assembly means 26 engages the outer periphery of the piston rod 28 and provides a fluid seal during axial sliding movement of the piston rod 28. The inner end of the piston rod 28 has secured thereon, as by welding, a piston 30 which carries a piston guide bearing 32 and a floating piston ring 34 that function in a manner well known in the art.

The piston 30 is normally biased to the position shown in FIGURE 1 in engagement with the inner end of the piston rod bearing 24 by means of a pair of coil springs 36 and 38 arranged in series within the pressure tube 18. The rearward end of the spring 36 is received over a guide member 40 abutting the inner face of the rear end plate 16, while the forward end of the spring 38 bears against an annular recessed shoulder 42 formed in the rearward end of the piston 30. Interposed between the two springs 36 and 38 is an annular spring guide member 44 which serves to guide the springs during compression and expansion in order to prevent buckling of the springs and resultant scoring of the inner wall of the pressure tube 18.

Formed in the wall of the pressure tube 18 are a plurality of longitudinally spaced bores 46 and coaxial openings 48. Seated within the openings 48 are bushings 50 having central bores 52 of the same diameter as the bores 46. The peripheral edges of the openings 48 are crimped over shoulders on the bushings 50 for securing the latter in position. The bushings 50 project outwardly of the pressure tube 18 and present annular seats 53 lying in a common plane. In accordance with the principles of my present invention, the sets of bores 46 and 52 are of a uniform diameter and are spaced apart exponentially.

Disposed within the shock absorber housing exteriorly of the pressure tube 18 is a flow control member 54 in the form of a cage or saddle assembly fabricated, for example, of upper and lower plate members 56 and 58 and side panels 60 suitably secured together as by welding. The saddle assembly 54 surrounds the pressure tube 18, and is axially located by means of a dowel pin 61 secured in the tube 18. The lower plate member 58 of the saddle assembly 54 has an upper planar surface 62 radially spaced its full extent from the pressure tube 18 adjacent the outer ends or seats 53 of the bushings 50 whereby to define annular metering orfices therebetween. The saddle assembly 54 is adapted to be moved radially relative to the pressure tube 18 for adjusting the distance between the planar surface 62 and the seats 53 so as to permit regulation of the size of each annular metering orifice defined therebetween. When referring herein to the size or effective area of a metering orifice, I mean the peripheral area of the imaginary cylindrical extension of the bore 52 lying between the plane of the seat 53 and the planar surface of the saddle assembly 54.

I shall now describe the means that I provide for effecting radial movement of the saddle assembly 54. On the side of the pressure tube 18 opposite the metering orifice means are a pair of independent adjustment means 64 arranged at opposite ends of the saddle assembly 54. Each adjustment means 64 comprises a socket set screw 66 threaded in the upper plate member 56 of the saddle assembly 54 with the lower end thereof being engageable with a recessed flat 68 formed in the pressure tube 18. Secured in the upper socket end of the screw 64 is the lower end of a spindle 70 that projects vertically outwardly of the housing 12. The spindle 70 has secured on its outer end an adjustment knob 72, which is preferably provided with a dial or calibrated plate 73, and carries intermediate of its ends a collar member 74. Interposed between the knob 72 and the collar 74 is a bushing member 76 having a downwardly extending cylindrical portion received in and projecting through a suitable opening formed in the top wall of the housing 12. A coil spring 78 is interposed between the bushing member 76 and the upper plate 56 of the saddle assembly 54 whereby to normally maintain the lower end of the screw 64 in engagement with the recessed flat 68 of the pressure tube 18. Rotation of the adjustment knob 72 causes rotation of the spindle 70 and the set screw 66 which effects relative movement between the screw 66 and the upper plate 56 thereby changing the radial position of the saddle assembly 54 relative to the pressure tube 18. If desired, indicator studs 79 may be secured in the tube 12 adjacent the knobs 72.

In addition to the foregoing, formed in the upper side of the pressure tube 18 are a pair of passageways 80 and 82, and formed in the underside of the tube 18 are passageways 84 and 86. Also, a sleeve member 88 is secured, as by welding, in an opening formed in the top side of the housing 12 and threaded therein is a filler plug 90. Finally, to make the shock absorber of my present invention operational, the shock absorber housing is filled with hydraulic fluid to the level of the lower end of the sleeve member 88. Hydraulic fluid may be introduced into the housing through the sleeve 88 when the plug 90 has been removed.

In the operation of the hydraulic shock absorber of my present invention, impact forces received by the piston rod 28 cause the piston 30 to move rearwardly within the pressure tube 18. During rearward movement of the piston 30, the hydraulic fluid within the rearward portion of the pressure tube 18 is forced outwardly thereof through the bores 46 and 52 and past the annular metering orifices defined between the bushing seats 53 and the planar surface 62 of the saddle assembly 54. Fluid leaving the metering orifices flows outwardly of the saddle assembly 54 through the open ends thereof. By metering the displacement of hydraulic fluid from the rearward portion of the pressure tube 18 in the manner described, high energy absorption or dissipation characteristics are attained. As the piston 30 moves past and closes off successive sets of bores 46 and 52, there is a reduction in the number of bores and their corresponding orifices, and hence in the total effective area of the orifices, through which hydraulic fluid can be displaced from the tube 18. At the beginning of the stroke of the piston rod 28, the total effective area of the orifices available for fluid displacement is at a maximum, while at the end of the stroke when the piston 30 has moved past all of the bores, the total effective area of the orifices available for fluid displacement is zero. Because the bores are of a uniform diameter and are spaced apart exponentially, and assuming that the planar surface 62 is parallel to the plane of the seats 53, the total effective orifice area decreases exponentially with the stroke of the piston. Under these conditions, the shock absorber provides a uniform stopping force as well as a uniform rate of deceleration throughout the stroke.

When the impact force is removed from the piston rod 28, the springs 36 and 38 serve to return the piston 30 and piston rod 28 to the position shown in FIGURE 1. During such forward motion of the piston 44, hydraulic fluid in the forward portion of the pressure tube 18 is permitted to flow outwardly thereof through the passageways 84 and 86, and any air entrapped in the hydraulic fluid is permitted to escape through the passageways 80 and 82.

When a load with a different kinetic load energy is to be absorbed, the adjustment knobs 72 may be rotated for turning the screws 66. If the screws 66 are turned in one direction, the saddle assembly 54 is moved radially upwardly and the planar surface 62 is moved closer to the seats 53 whereby the size of the annular orifices defined therebetween is decreased. If the screws 66 are turned in the other direction, the saddle assembly 54 is moved radially downwardly and the planar surface 62 is moved away from the seats 53 whereby the size of the annular orifices defined therebetween is increased. On the one hand, the size of the orifices may be uniformly increased or decreased by rotating the adjustment knobs 72 an equal amount in the same direction. On the other hand, the size of the orifices may be non-uniformly increased or decreased by turning the adjustment knobs 72 an unequal amount or in opposite directions. In connection with the foregoing changes, when the planar surface 62 is maintained parallel to the plane of the seats 53, the total effective orifice area will decrease exponentially with the stroke of the piston 30. However, this relationship may be modified by adjusting the planar surface 62 to a plane which is not parallel to the plane of the seats 53. Thus, the shock absorber 10 is capable of providing regular, or modified, exponential damping. As an alternative to bores of the same diameter exponentially spaced apart, the same operating characteristics may be obtained by providing uniformly spaced bores of exponentially varying diameter. Although the hydraulic shock absorber of my present invention has been shown and described as lying in a horizontal position, it is to be understood that the shock absorber will operate equally effectively in an upright position or in any other position.

While I have shown and described what I believe to be a preferred embodiment of my present invention, it will be understood by those skilled in the art that various rearrangements and modifications may be made therein without departing from the spirit and scope of my invention.

I claim:

1. For use in a shock absorber comprising a pressure tube having a plurality of axially aligned and longitudinally spaced bores in the wall thereof with exterior annular seats thereabout, a piston axially movable within the pressure tube, and a piston rod connected to the piston and extending outwardly of the pressure tube for receiving impact forces, the combination of a saddle assembly surrounding the pressure tube and having a planar surface adjacent the seats whereby annular orifices are defined therebetween, and means for independently moving the opposite ends of said saddle assembly radially of the pressure tube for adjusting the distance between said planar surface and the seats so as to permit the size of the orifices to be regulated.

2. For use in a shock absorber comprising a housing, a pressure tube having a plurality of axially aligned and longitudinally spaced bores in the wall thereof with exterior annular seats thereabout, a piston axially movable within the pressure tube, and a piston rod connected to the piston and extending outwardly of the pressure tube and the housing for receiving impact forces, the combination of a saddle assembly surrounding the pressure tube and having a planar surface adjacent the seats whereby annular orifices are defined therebetween, and a pair of independent adjustment means carried by the housing at opposite ends of said saddle assembly for moving the latter radially of the pressure tube for adjusting the distance between said planar surface and the seats so as to permit the size of the orifices to be regulated.

3. The combination of claim 2 wherein each of said independent adjustment means comprises screw means threaded in said saddle assembly and having one end engageable with the pressure tube, spring means intermediate the housing and said saddle assembly for maintaining one end of said screw means in engagement with the pressure tube, and rotatable spindle means extending through the housing and engaging said screw means whereby the latter may be rotated for varying the radial position of said saddle assembly relative to the pressure tube.

4. The combination of claim 2 wherein said planar surface and said pair of adjustment means are located on opposite sides of the pressure tube.

References Cited

UNITED STATES PATENTS

| 1,313,763 | 8/1919 | Thomas | 188—88 |
| 3,045,781 | 7/1962 | Lees | 188—97 |
| 3,201,110 | 8/1965 | Taccone | 188—97 X |
| 3,207,270 | 9/1965 | Ellis | 188—88 X |

MILTON BUCHLER, *Primary Examiner.*

G. E. HALVOSA, *Assistant Examiner.*